United States Patent [19]

Imaseki

[11] Patent Number: 4,966,250

[45] Date of Patent: Oct. 30, 1990

[54] ACTIVE DRIVING FORCE CONTROL FOR FOUR-WHEEL DRIVE VEHICLE

[75] Inventor: Takashi Imaseki, Zushi, Japan

[73] Assignee: Nissan Motor Co., Ltd., Yokohama, Japan

[21] Appl. No.: 255,820

[22] Filed: Oct. 11, 1988

[30] Foreign Application Priority Data

Oct. 9, 1987 [JP] Japan .................................. 62-255745

[51] Int. Cl.⁵ ........................ B60K 17/20; B60K 23/04
[52] U.S. Cl. .................... 180/233; 180/197; 180/248; 364/424.1; 475/86; 475/88; 475/231; 475/240
[58] Field of Search ...................... 180/233, 197, 248; 475/86, 88, 231, 240; 364/424.1

[56] References Cited

U.S. PATENT DOCUMENTS

| | | | |
|---|---|---|---|
| 3,264,900 | 8/1966 | Hartupee | 475/231 |
| 3,362,258 | 1/1968 | Thornton | 475/231 |
| 3,402,796 | 9/1968 | Mieras | 192/107 |
| 3,724,289 | 4/1973 | Kennicutt | 475/88 |
| 3,837,236 | 9/1974 | Kagata | 475/240 |
| 3,906,812 | 9/1975 | Kagata | 180/233 |
| 4,511,014 | 4/1985 | Makita | 180/197 |
| 4,583,424 | 4/1986 | von Hiddessen et al. | 475/86 |
| 4,644,823 | 2/1987 | Mueller | 475/86 |
| 4,679,463 | 7/1987 | Ozaki et al. | 475/86 |
| 4,757,870 | 7/1988 | Torii et al. | 180/233 |

FOREIGN PATENT DOCUMENTS

| | | |
|---|---|---|
| 64669 | 11/1982 | European Pat. Off. . |
| 0206473 | 12/1986 | European Pat. Off. . |
| 0215352 | 3/1987 | European Pat. Off. . |
| 0262908 | 4/1988 | European Pat. Off. . |
| 3025282 | 2/1982 | Fed. Rep. of Germany . |
| 3040120 | 4/1982 | Fed. Rep. of Germany . |
| 3516982C1 | 6/1986 | Fed. Rep. of Germany . |
| 3605489A1 | 9/1986 | Fed. Rep. of Germany . |
| 58-221046 | 12/1983 | Japan . |
| 61-67632 | 4/1986 | Japan . |
| 61-102320 | 5/1986 | Japan . |
| 61-157136 | 7/1986 | Japan . |
| 62-103226 | 5/1987 | Japan . |
| 62-103227 | 5/1987 | Japan . |
| 797921 | 4/1979 | U.S.S.R. . |
| 1110967 | 4/1983 | U.S.S.R. . |
| 1379416 | 1/1975 | United Kingdom . |
| 2102907 | 2/1983 | United Kingdom . |
| 2104178 | 3/1983 | United Kingdom . |

Primary Examiner—Mitchell J. Hill
Attorney, Agent, or Firm—Foley & Lardner

[57] ABSTRACT

A method of and system for controlling a torque distribution over four wheels of four-wheel drive vehicle when the vehicle is making a turn. When an outer wheel revolution speed is higher than an inner wheel revolution speed, a differential action limiting force is decreased or weakened and a torque distribution ratio, viz., a ratio of a portion of torque distributed toward the front wheels (secondary driving wheels) to the remaining portion of torque distributed toward the rear wheels (primary driving wheels), is decreased. When the inner wheel revolution speed is higher than the outer wheel revolution speed, the differential acting limiting force is increased or strengthened and the torque distribution ratio is increased.

6 Claims, 5 Drawing Sheets

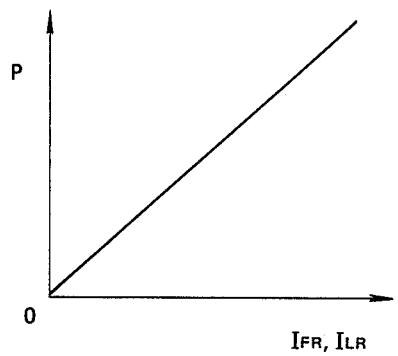
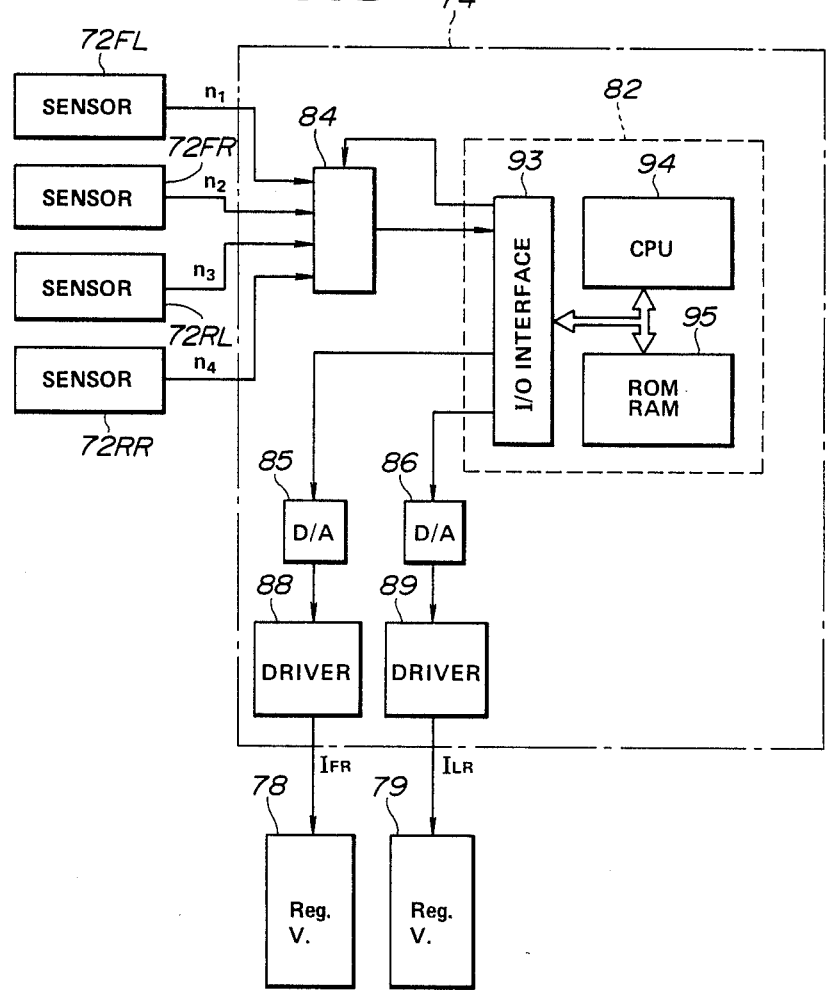

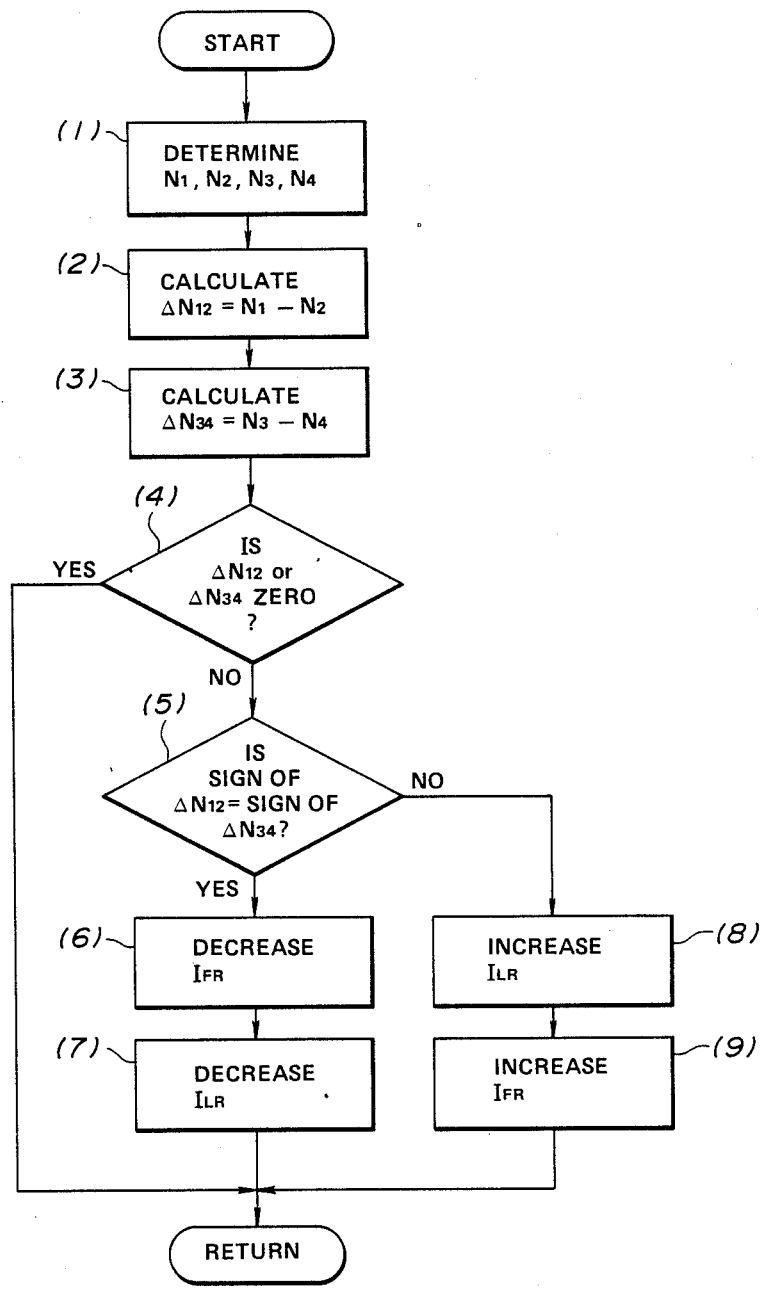

ACTIVE DRIVING FORCE CONTROL FOR FOUR-WHEEL DRIVE VEHICLE

BACKGROUND OF THE INVENTION

The present invention relates to a system for and a method of controlling torque distribution for a pair of primary driving wheels and a pair of secondary driving wheels of a motor vehicle of the four wheel drive type, and more particularly to a system for and a method of actively controlling such torque distribution.

JP No. 61-157437 discloses a system for controlling a torque distribution ratio of a portion of torque delivered toward secondary front driving wheels to the remaining portion of torque delivered to primary rear driving wheels. According to this system, the torque distribution ratio is varied in response to a revolution speed differential between the front wheel side and rear wheel side.

This known system increases the torque distribution ratio to increase the torque portion delivered to the front wheels in response to an increase in revolution speed differential induced when the vehicle travels on a road with low friction coefficient. If, under this four-wheel drive condition, the driver turns the steering wheel to change the direction of heading of the front wheels to cause the vehicle to make a turn, the vehicle exibits an understeer characteristic, and thus the readiness of the vehicle to change its heading is poor.

An object of the present invention is to eliminate the above mentioned drawback encountered in the known torque distribution control system.

More specifically, an object of the present invention is to improve a system for and a method of controlling torque distribution over wheels of a motor vehicle such that, when the vehicle is making a turn, the readiness of the vehicle to turn its heading is improved without decreasing the torque portion delivered to the front wheels.

SUMMARY OF THE INVENTION

According to the present invention, the above-mentioned objects have been accomplished by increasing a force with the differential action between the primary driving wheels with a torque portion delivered to the secondary driving wheels kept at an increased level when the inner wheel slips and thus the wheel revolution speed of the inner wheel is higher than that of the outer wheel when the vehicle is making a turn.

According to one aspect of the present invention, there is provided a system for controlling a torque distribution over pair of primary driving wheels and a pair of secondary driving wheels of a motor vehicle when the motor vehicle is making a turn, the vehicle having a torque split and transfer means for varying the torque distribution ratio of the portion of torque toward the pair of secondary driving wheels to the remaining portion of torque toward the pair of the primary driving wheels in response to a torque distribution ratio indicative signal, and a limited slip differential means disposed between the pair of primary driving wheels for varying a differential limiting force between the pair of primary driving rear wheels in response to a differential limiting force indicative signal, the system comprising:

means for generating a wheel revolution speed differential indicative signal indicative of a revolution speed of an outer one of the pair of primary driving wheels and an inner one of the pair of primary driving wheels;

means for varying the distribution ratio indicative signal in such a direction as to cause the torque split and transfer means to decrease the torque distribution ratio and for varying the differential limiting force indicative signal in such a direction as to cause the the limited slip differential means to decrease the differential limiting force when said wheel revolution speed indicative signal indicates that the wheel revolution speed of the outer one of the pair of driving wheels is higher than the wheel revolution speed of the inner one of the pair of driving wheels; and means for varying the differential limiting force indicative signal in such a direction as to cause the limited slip differential to increase the differential limiting force and for varying the distribution ratio indicative signal in such a direction as to cause the torque split and transfer means to increase the torque distribution ratio when said wheel revolution speed differential indicative signal indicates that the wheel revolution speed of the inner one of the pair of driving wheels is higher than the wheel revolution speed of the outer one of the pair of driving wheels.

According to another aspect of the present invention, there is provided a method of controlling torque distribution over a pair of primary driving wheels and a pair of secondary driving wheels of a motor vehicle when the motor vehicle is making a turn, the vehicle having a torque split and transfer means for varying the torque distribution ratio of a portion of the torque toward the pair of secondary driving wheels to the remaining portion of the torque toward the pair of primary driving wheels in response to a torque distribution ratio indicative signal, and a limited slip differential means disposed between the pair of primary driving wheels for varying a differential limiting force between the pair of primary driving rear wheels in response to a differential limiting force indicative signal, the method comprising the steps of:

generating a wheel revolution speed differential indicative signal indicative of a revolution speed of an outer one of the pair of primary driving wheels and an inner one of the pair of primary driving wheels;

varying the distribution ratio indicative signal in such a direction as to cause the torque split and transfer means to decrease the torque distribution ratio and varying the differential limiting force indicative signal in such a direction as to cause the the limited slip differential means to decrease the differential limiting force when said wheel revolution speed indicative signal indicates that the wheel revolution speed of the outer one of the pair of driving wheels is higher than the wheel revolution speed of the inner one of the pair of driving wheels; and varying the differential limiting force indicative signal in such a direction as to cause the limited slip differential to increase the differential limiting force and varying the distribution ratio indicative signal in such a direction as to cause the torque split and transfer means to increase the torque distribution ratio when said wheel revolution speed differential indicative signal indicates that the wheel revolution speed of the inner one of the pair of driving wheels is higher than the wheel revolution speed of the outer one of the pair of driving wheels.

BRIEF DESCRIPTION OF THE DRAWINGS

FIG. 4 is a graph showing variation of output pressure of the each of pressure regulator valves with variation of an input instruction value;

FIG. 5 is a block diagram of a controller with wheel revolution sensors and pressure regulator valves; and FIG. 6 is a flow chart.

DETAILED DESCRIPTION OF THE INVENTION

Figure 1:
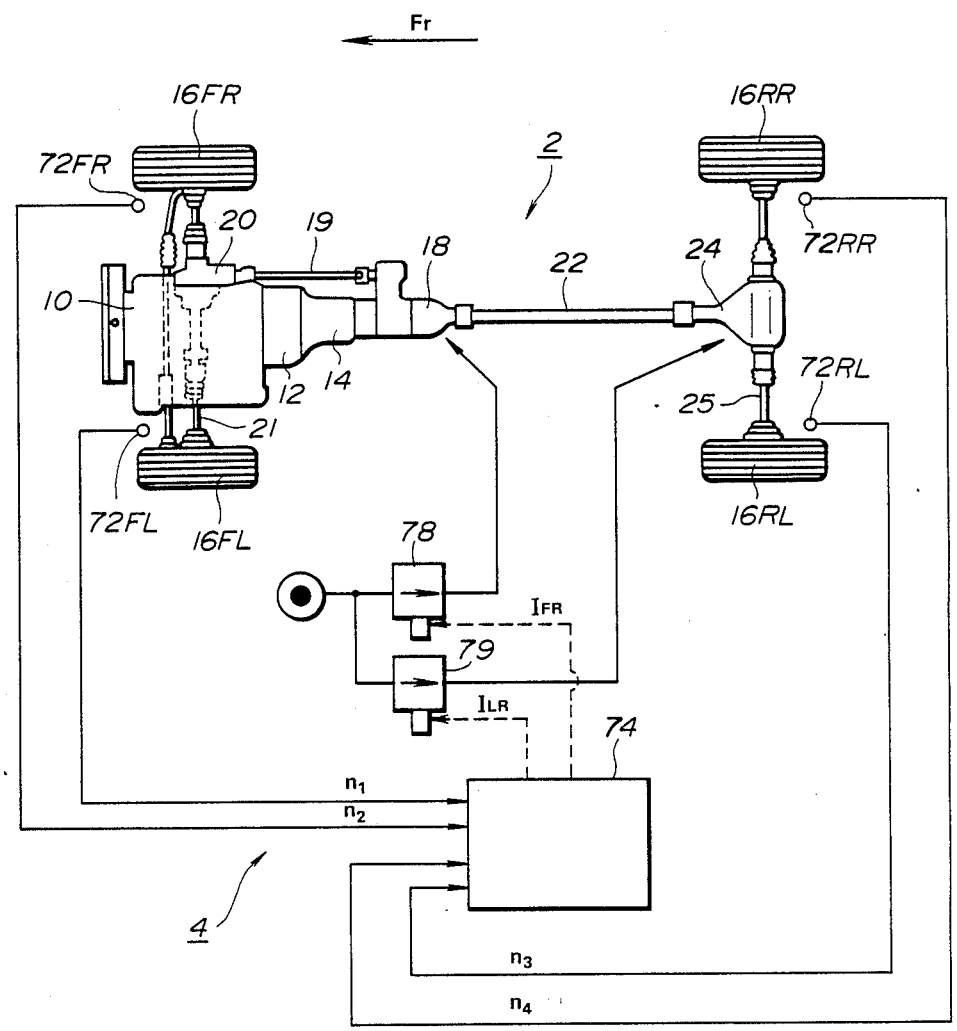
FIG. 1 is a block diagram of an embodiment according to the present invention.

Referring to the accompanying drawings and particularly to FIG. 1, the reference numeral 2 generally indicates a power train system for a motor vehicle of the four-wheel drive and front engine rear drive type, while the reference numeral 4 generally indicate system for controlling a torque distribution over the four wheels of the motor vehicle.

As shown in FIG. 1, the motor vehicle includes an engine 10 followed by a clutch 12 and a transmission 14. The output of the transmission 12 is supplied to a torque split and transfer unit 18 where the output torque is split into a portion to be delivered to secondary driving front wheels 16FL and 16FR and a remaining portion of the output torque is delivered to primary driving rear wheels 16RL and 16RR. The first portion of the torque is delivered to the front wheels 16FL and 16FR via a shaft 19, a front differential 20, and a front drive axle assembly 21. The remaining portion of the torque is delivered to the rear wheels 16RL and 16RR via a drive shaft 22, a limited slip differential (LSD) 24, and a rear drive axle assembly 25.

Figure 2:
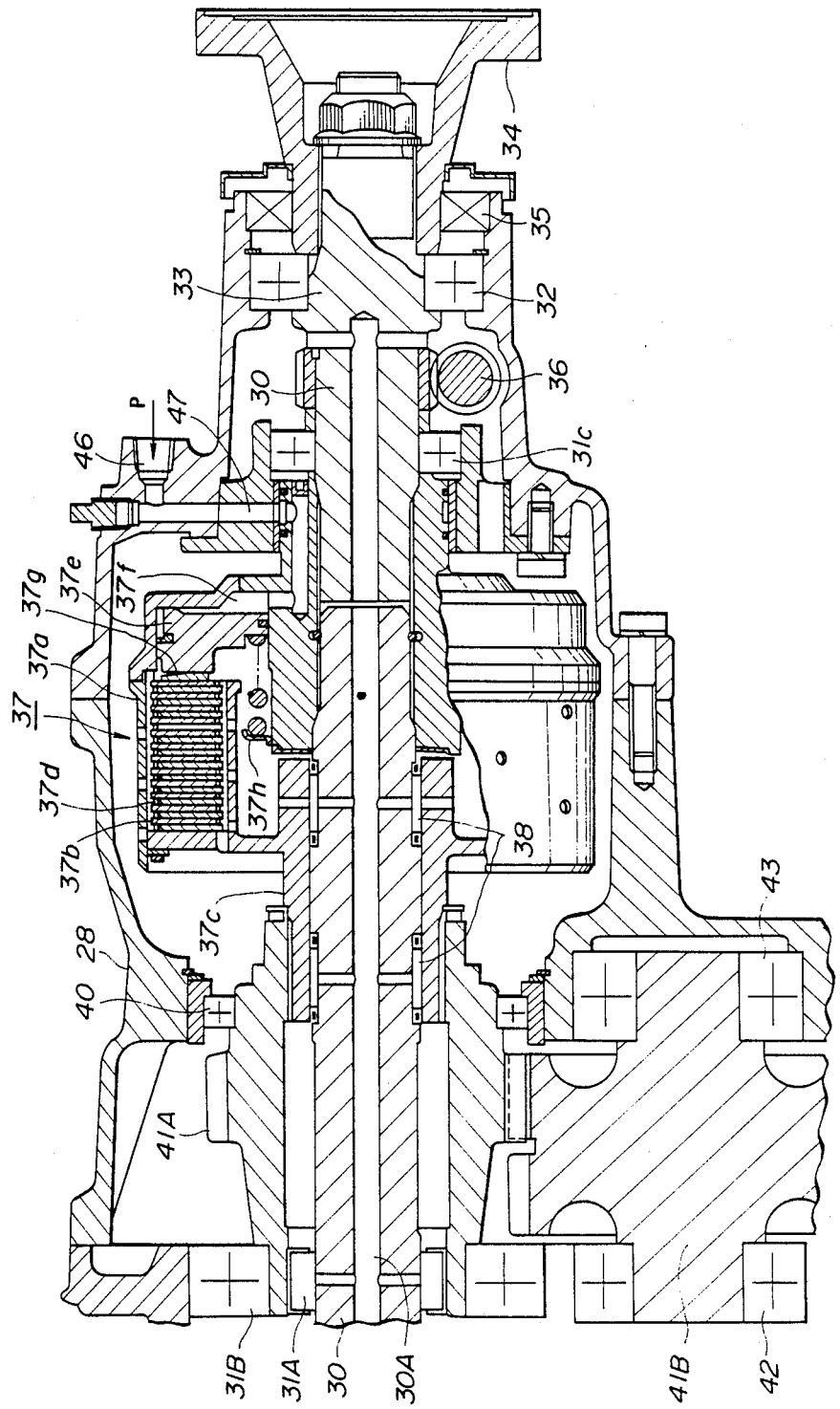
FIG. 2 is a longtudinal fragmentary section of a torque split and transfer unit used in the embodiment.

Referring to FIG. 2, the transfer unit 18 is illustrated. This transfer unit is substantially the same as a transfer unit illustrated in FIG. 2 and described in U.S. Pat. No. 4,757,870 issued on Jul. 19, 1988 to Torii et al. which has been incorporated herein by reference in its entirety.

Briefly, the transfer unit 18 includes a transfer case 28. Extending into this transfer case 28 is an input shaft 30 fixedly coupled with the output shaft of the transmission 14. This input shaft 30 is rotatably supported by means of bearings 31A, 31B and 31C. As viewed in FIG. 2, the input shaft 30 has a righthand end fixedly rotatable with an output shaft 33 that is rotatably supported by means of bearing 32. The output shaft 33 has fixedly connected thereto, by a spline connection, an attachment flange 34 which is fixedly connected to the drive shaft 22 (see FIG. 1). There are also illustrated an oil seal 35 and a pinion 36 for a speedometer.

The reference numeral 37 generally indicates a multiple-plate hydraulic clutch 37. This hydraulic clutch 37 is engaged with an engagement force proportional to a torque distribution ratio indicative hydraulic pressure and varies the torque distribution ratio of the portion of torque delivered toward the front wheels 16FL and 16RL to the remaining portion of torque delivered toward the rear wheels 16RL and 16RR. This clutch 37 includes a clutch drum 37a splined to the input shaft 30. A plurality of driving clutch plates 37b are splined to the clutch drum and interleaved with a plurality of driven clutch plates 37d which are splined to a clutch hub 37c. The clutch hub 37c is rotatably supported by the input shaft 30 by means of needle bearing 38. The clutch 37 also includes a clutch piston 37e and a cylindrical servo chamber 37f defined between the clutch piston 37e and the radial closed end wall of the clutch drum 37a. There are also illustrated a dish plate 37g and a clutch return spring 37f.

The clutch hub 37c is splined to a first gear 41A which is rotatably supported by the transfer case 28 by means of bearings 31B and 40. This first gear 41A is in mesh with a second gear 41B which is rotatably supported in the transfer case 28 by means of bearings 42 and 43. The second gear 41B is fixedly coupled with the shaft 19 leading toward the front wheels 16FL and 16FR.

The before-mentioned hydraulic fluid pressure indicative of desired torque distribution is supplied to an inlet port 46. The inlet port 46 communicates with a fluid passage 47 formed through the transfer unit. This fluid passage 47 communicates with the cylinder chamber 37F.

When there is no supply of hydraulic fluid pressure to the inlet port 46, there is no hydraulic fluid pressure build-up on the cylinder chamber 37f. Since no pressure acts on the clutch piston 37e, the interleaved clutch plates 37b and 37d are disengaged owing to the action of the return spring 37h. In this state, all of the input torque applied to the input shaft 30 is delivered toward the rear wheels 16RL and 16RR, and thus the torque distribution ratio is 0:100. When there is a supply of hydraulic fluid pressure to the inlet port 46, the clutch piston 37e urges the interleaved clutch plates 37b and 37d into engagement with each other against the action of the return spring 37h, allowing a portion of the input torque to be delivered through the frictional engagement between the interleaved clutch plates 37b and 37d toward the front wheels 16FL and 16FR. This portion of the input torque varies in proportion to a clutch engagement force between the interleaved clutch plates 37b and 37d. The clutch engagement force in turn is variable in proportion to the magnitude of the hydraulic fluid pressure supplied to the inlet port 46. This, the torque distribution ratio between the front and rear wheels is variable in response to the hydraulic fluid pressure supplied to the inlet port 46 from 0:100 to 50:50.

Figure 3:
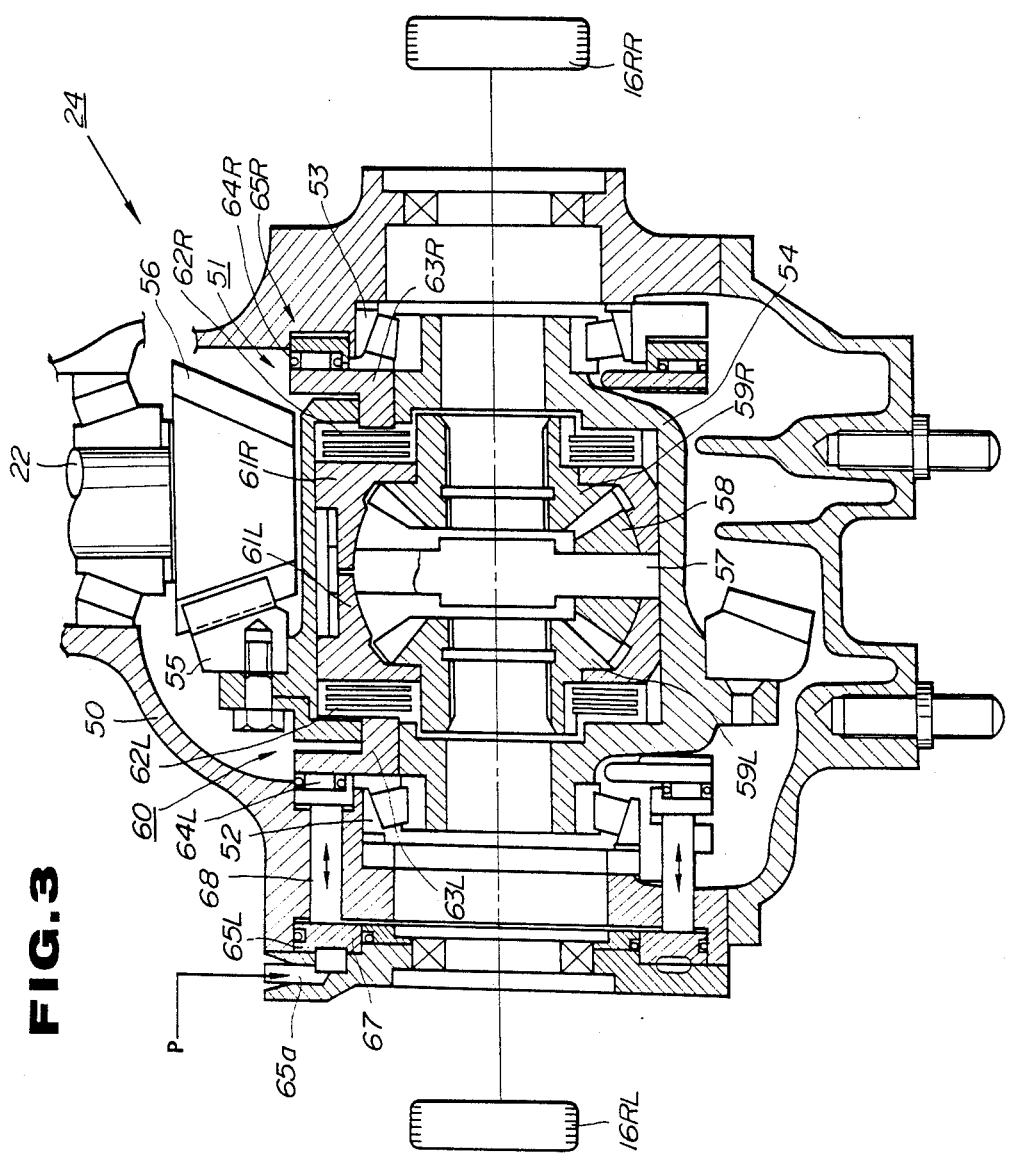
FIG. 3 is a section of a limited slip differential used in the embodiment.

Referring to FIG. 3, there is illustrated the limited slip differential 24. This limited slip differential 24 is substantially the same as the limited slip differential illustrated in FIG. 1 and described in U.S. Pat. No. 4,679,463 issued on Jul. 14, 1987 to Ozaki et al., which incorporated herein by reference in its entirety.

Briefly, the limited slip differential 24 includes within a housing 50 a differential mechanism 51. The differential mechanism 51 includes a differential gear case 54 rotatably supported within the housing 50 by means of bearings 52 and 53. The differential gear case 54 has fixed thereto a final ring gear 55 which is in mesh with a drive pinion gear 56 of the drive shaft 22.

Within the differential gear case 54, there are pinion gears 58 rotatably mounted on a pinion mate shaft 57, and a pair of side gears 59L and 59R meshing with the pinion gears 58. Splined to the side gears 59L and 59R are inner end portions of rear drive axles 25 of the rear left and right wheels 16RL and 16RR, respectively.

There is provided in the differential gear case 54 a differential action limiting mechanism 60. This differential limiting mechanism 60 includes a pair of pressure rings 61L and 61R rotatably mounted on side gears 59L and 59R, respectively. Although not shown, the pressure rings 61L and 61R are formed with wedge-shaped notches. The differential limiting mechanism 60 also includes hydraulic friction clutches 62L and 62R which are engaged by the associated preload applying levers 63L and 63R, and cylinder portions 65L and 65R which bias the associated preload applying levers 63L and 63R via bearings 64L and 64R, respectively. The left cylinder portion 65L is formed in a lefthand end, as viewed in FIG. 3, of the housing 50, and it has a piston 67 which has a piston rod 68 extending through the housing 50 to the preload applying lever 63L.

When, the vehicle is travelling straight forward with the steering wheel held in its neutral center position, there occurs no rotation speed differential between the left and right rear wheels 16RL and 16RR. Thus, input to the differential mechanism 51 from the drive shaft 22 is transmitted via the drive pinion gear 56 and the final gear 55 to the differential case 54, and then to the pinion mate shaft 57, and to the side gear 59L and 59R via the pinion gears 58, and to the rear wheels 16RL and 16RR via the rear drive axles 25. In this running state of the vehicle, therefore, the differential gear case 54 and side gears 59L and 59R rotate at the same speed, so that the pressure rings 61L and 61R are not thrown radially outward. Thus, the differential limiting mechanism 60 remains deactivated.

When the vehicle is making a right turn, for example, there is the supply of hydraulic fluid pressure to an inlet port 65a (see FIG. 3), inducing a differential action limiting force. In this state, the pressure rings 61L and 61R are thrown radially outward owing to the edge action, causing the friction clutches 62L and 62R to produce differential limiting force. As a result, the torque of the side gear 59L connected to the outer one 16RL of the rear wheels decreases, whereas the torque of the side gear 59R connected to the inner one 16RR of the rear wheels increases. The differential limiting force is variable with clutch engagement forces at the friction clutches 62L and 62R which are variable in proportion to the hydraulic fluid pressure supplied to the inlet port 65a.

Referring back to FIG. 1, the torque distribution control system 4 includes wheel revolution sensors 72FL, 72FR, 72RL, and 72RR for measuring revolutions of the four wheels 16FL, 16FR, 16RL, and 16RR, respectively. Each of these sensors generates an output in the form of a train of pulses variable with the revolution of the associated wheel. The outputs of these sensors $n_1$, $n_2$, $n_3$, and $n_4$ are supplied to a controller 74 which generates outputs indicative or instruction values $I_{FR}$ and $I_{LR}$ given by arithmetic operations based on the inputs. The reference numeral 76 indicates a hydraulic fluid pressure source. Two pressure regulator valves 78 and 79 are provided which regulate the hydraulic fluid pressure from the source 76 in response to the outputs of the controller 74. The output hydraulic fluid pressure of the pressure regulator valve 78 is supplied to the transfer unit 18 at the inlet port 46, while the output hydraulic fluid pressure of the other pressure regulator valve 79 is supplied to the limited slip differential 24 at the inlet port 65a.

The wheel revolution sensors 72FL and 72FR are arranged to measure revolutions of the front drive axles 21, while the other two wheel revolution speed sensors 72RL and 72RR are arranged to measure revolutions of rear drive axles 25. The reference character $n_1$ indicates the sensor output indicative of revolution of the front left wheel 16FL, $n_2$ a front right wheel 16FR, $n_3$ a rear left wheel, and $n_4$ a rear right wheel, The hydraulic fluid pressure source 76 includes a pump driven by the engine 10, a relief valve, and a reverse flow check valve. The output hydraulic fluid pressure of the source 76 is supplied to the pressure regulator valves 78 and 79. Each of the pressure regulator valves 78 and 79 includes a proportional type solenoid having an excitation coil which receives an electric current variable in response to the output $I_{FR}$ or $I_{LR}$. The output pressures P of the pressure regulator valves 78 and 79 vary in proportion to the associated instruction values $I_{FR}$ and $I_{LR}$ as shown by the graph in FIG. 4.

Referring to FIG. 5, the controller 74 includes a microcomputer 82, a mutiplexer 84, digital analog converters 85, 86, and 88 and 89.

The microcomputer 82 includes an input/output interface 93, a memory 95 having a ROM and a RAM, an a central processor unit (CPU) 94. The ROM of the memory 94 contains a control program among other control programs which will be described along with the flow chart of FIG. 6.

Hereinafter, the operation of the above-mentioned embodiment is explained referring also to the flow chart of FIG. 6.

Referring to FIG. 1, when the engine 10 starts, the hydraulic fluid source 76 begins to supply a working hydraulic fluid under constant pressure to the pressure regulator valves 78 and 79. Concurrently with the start-up of the engine 10, the controller 74 is activated to execute the flow chart illustrated in FIG. 6. The execution of the flow chart is initiated by timer interruption taking place upon elapse of a predetermined time (for example, 20 milliseconds).

In FIG. 6, at a step (1), the CPU 94 controls the multiplexer 84 to read in pulse signals $n_1$ to $n_4$ generated by the wheel revolution sensors 72RL to 72RR via the interface circuit 93 sequentially on a time sharing basis, and counts the number of pulses within an unit time to determine wheel revolution speeds $N_1$ to $N_4$ of the wheels 16RL to 16RR, respectively, and stores the results in the RAM as temporary data.

At a step (2), in order to detect steering direction, i.e., direction of steered wheel heading, a front side wheel revolution speed differential $\Delta N_{12}$ (delta $N_{12}$) between the front wheels 16FL and 16FR is determined by computing the equation $\Delta N_{12} = N_1 - N_2$, and the result is stored in the RAM as temporary data.

At a step (3), a rear side wheel revolution speed differential $\Delta N_{34}$ is determined by computing the equation $\Delta N_{34} = N_3 - N_4$, and the result is stored in the RAM as temporary data.

At a step (4), the CPU 94 makes a judgement whether the vehicle is travelling straight forward or making a turn. At this step (4), it is judged whether or not at least one of the wheel revolution speed differentials $\Delta N_{12}$ and $\Delta N_{34}$ is equal to zero. The answer is YES when the vehicle is travelling along a generally straight road. In this case, this flow chart comes to an end after initiating the execution of an interruption program, not shown. In this interruption program, a wheel revolution speed differential $\Delta N_{FL}$ between the front and rear wheels is determined by calculation, and the torque distribution ratio is controlled in a well known manner based on this wheel revolution speed differential such that a two-wheel drive is established when $\Delta N_{FL} = 0$, for example, while a four-wheel drive is established in such a manner that a portion of the torque distribution ratio increases in proportion to $\Delta N_{FL}$. The torque distribution ratio is varied by varying the clutch engagement force of the clutch 37 of the transfer unit 18. According to this control, there are prevented a wheel spin taking place at quick acceleration and a wheel lock taking place at quick deceleration. Besides, there is prevented a wheel slip while the vehicle is running on a road with a low friction coefficient, such as a snow covered road and a rain wet road.

When, on the contrary, the answer at the previous step (4), is NO, it is judged that the vehicle is making a turn. At a step (5), the sign of the wheel revolution speed differential $\Delta N_{12}$ (delta $N_{12}$) is compared with the sign of the wheel revolution speed differential $\Delta N_{34}$ (delta $N_{34}$).

When the sigh of the front wheel revolution speed differential $\Delta N_{12}$ (delta $N_{12}$) is the same as the sign of the rear wheel revolution speed differential $\Delta N_{34}$ (delta $N_{34}$), it is judged that the vehicle is making a left turn (when the signs are both negative) or a right turn (when the signs are both positive) and there is no slip of an inner one of the main driving wheels (namely, rear wheels 16RL and 16RR in this embodiment) since the the wheel revolution speed of the outer wheel is higher than the wheel revolution speed of the inner wheel. Then, the flow chart proceeds to steps (6) and (7).

At the step (6), the CPU 94 delivers an instruction for decreasing the portion of driving torque to be distributed to the front wheels. More specifically, in order to set a torque distribution ratio for the portion of torque delivered toward the front wheels to the remaining portion delivered toward the rear wheels to 10:90, the CPU 94 performs a table look-up operation to retrieve an instruction value $I_{FR}$ corresponding to this torque distribution ratio and delivers control signal $S_{FR}$ corresponding to this instruction value to the A/D converter 85 via the interface circuit 93. The control signal $S_{FR}$ is converted by the A/D converter 85 to an analog signal, causing the driver 88 to deliver the instruction value $I_{FR}$ to the excitation coil of the pressure regulator valve 78. This causes the pressure regulator valve 78 to supply the inlet port 46 of the clutch 37 of the transfer 18 with hydraulic fluid pressure P proportional to the instruction value $I_{FR}$, causing the clutch 37 to engage with an engagement force corresponding to the hydraulic fluid pressure P. As a result, the torque distribution ratio is adjusted to 10:90.

Subsequently, at the step (7), the CPU 94 delivers an instruction to decrease a differential action limiting force at which a differential action between the rear wheels 16RL and 16RR is limited. That is, the CPU 94 sets the control signal $S_{LR}$ to be delivered to the A/D converter 86 equal to zero, i.e., $S_{LR}=0$, setting an instruction value $I_{LR}$ delivered by the driver 89 to the excitation coil of the pressure regulator valve 79 equal to zero. This causes a hydraulic fluid pressure P supplied to the inlet port 65a of the differential limiting mechanism 60 of the limited slip differential 24 to drop to zero, deactivating the differential limiting mechanism 60. Thus, an engagement force at which the clutches 62L and 62R are engaged are eliminated, allowing the differential mechanism 58 to perform a differential action.

Since, in the above-mentioned manner, the torque distribution ratio is varied in such a direction as to increase a torque portion delivered to the rear wheels, and the differential limiting force is decreased or weakened while the vehicle is making a turn, there is avoided understeer of the front wheels otherwise taking place and there is avoided or at least decreased overmoment otherwise taking place. These cooperate to considerably enhance the readiness of the vehicle to change its heading.

When, at the step (5), it is found that the sign of the front wheel revolution speed differential $\Delta N_{12}$ (delta $N_{12}$) is different from the sign of the rear wheel revolution speed differential $\Delta N_{34}$ (delta $N_{34}$), it is judged that the wheel revolution speed of an inner one of the main driving wheels (rear wheels 16RL and 16RR in this embodiment) is higher than the revolution speed of an outer driving wheel and the inner wheel undergoes a slip while the vehicle is making a left turn (when the sign of $\Delta N_{12}$ is negative and the sign of $\Delta N_{34}$ is positive) or a right turn (when $\Delta N_{12}$ is positive and $\Delta N_{34}$ is negative). Thereafter, the flow chart proceeds to steps (8) and (9).

At the step (8), the CPU 94 delivers an instruction to increase the differential limiting force between the rear wheels 16RL and 16RR. More specifically, the value of the control signal $S_{LR}$ is increased, inducing an increase in the instruction value $I_{LR}$ supplied to the excitation coil of the pressure regulator valve 79 by the driver 89. This causes an increase in hydraulic fluid pressure supplied to the differential limiting mechansim 60 by the pressure regulator valve 79, resulting in an increase in the engaging force at which the clutches 62L and 62R are engaged. As a result, the differential limiting mechanism 60 is activated.

Thus, the inner wheel slip is suppressed, and the driving torque delivered to the outer driving wheel 16RL or 16RR is increased, inducing a yawing momment in a direction of the heading of the vehicle.

Then, at the step (9), the CPU 94 delivers an instruction to increase the portion of the torque delivered to the front wheels. More specifically, the CPU 94 determines by calculation an instruction value $I_{FR}$ corresponding to the torque distribution ratio 50:50 and delivers a control signal $S_{FR}$ corresponding to this instruction value. This causes an increase in hydraulic fluid pressure P supplied by the pressure regulator valve 78 to the clutch 37 of the unit 18, inducing an engagement force at which 37 is engaged. As a result, the four-wheel drive state with the driving torque distributed to the front and rear wheels at the ratio 50:50 is accomplished.

In summary, according to the procedures involving the jobs at the steps (8) and (9), in the case where the inner rear driving wheel is slipping, a yawing moment of the vehicle is induced and the portion of the torque delivered to the front wheels, so that the ground contact of the front wheels is improved. As a result, without any increase in understeer, the total driving force is enhanced with ample readiness of the vehicle to change the direction of its heading.

In the preceding embodiment, four wheel revolution speeds are arranged to generate pulse trains indicative of wheel revolutions of the four wheels, respectively, and it is judged whether or not the vehicle is making a turn and whether or not there occurs a wheel slip during turning. The wheel revolution speed sensors for the front wheels may be eliminated and replaced with a steered angle sensor. In this case, a positive sign is provided when it is judged based on the output of the steered angle sensor that the vehicle is making a right turn, while a negative sign is provided when it is judged based on the output of the steered angle sensor that the vehicle is making a left turn. Then, it is compared with the sign of the wheel revolution speed differential between the pair of rear wheels. The number of wheel revolution sensors, therefore, can be descreased to half.

Alternatively, the instruction values $I_{LR}$ and $I_{FR}$ may be produced by function generators, respectively. One function generator contains a function whereby the instruction value $I_{LR}$ takes relatively larger values when the wheel revolution speed differential between the pair of rear wheels is relatively small, while the former takes relatively small values when the latter is relatively large. The other function generator contains a function whereby the instruction value $I_{FR}$ is varied in proportion to the wheel revolution speed differential. Of course, it may be possible to vary the instruction values in a step manner.

What is claimed is:

1. A system for controlling torque distribution to a pair of primary driving wheels and a pair of secondary driving wheels of a motor vehicle when said motor vehicle is making a turn, said vehicle having a torque split and transfer means for varying a torque distribution ratio which is the ratio of a portion of torque distributed to said pair of secondary driving wheels to the remaining portion of torque distributed to said pair of primary driving wheels in response to a torque distribution ratio indicative signal, and limited slip differential means disposed between said pair of primary driving wheels for varying differential limiting force between said pair of primary driving wheels in response to a differential limiting force indicative signal, said system comprising:

means for generating a wheel revolution speed differential indicative signal indicative of wheel revolution speed of an outer one of said pair of primary driving wheels and an inner one of said pair of primary driving wheels;

means for varying said distribution ratio indicative signal in such a direction as to cause said torque split and transfer means to decrease said torque distribution ratio and for varying said differential limiting force indicative signal in such a direction as to cause the said limited slip differential means to decrease differential limiting force when said wheel revolution speed indicative signal indicates that said wheel revolution speed of said outer one of said pair of primary driving wheels is higher than said wheel revolution speed of said inner one of said pair of primary driving wheels; and means for varying said differential limiting force indicative signal in such a direction as to cause the limited slip differential to increase the differential limiting force and varying the distribution ratio indicative signal in such a direction as to cause said torque split and transfer means to increase said distribution ratio when said wheel revolution speed differential indicative signal indicates that said wheel revolution speed of said inner one of said pair of driving wheels is higher than said wheel revolution speed of said outer one of the pair of driving wheels.

2. A system as claimed in claim 1, wherein said wheel revolution speed differential indicative signal generating means includes first wheel revolution sensors arranged to generate pulse trains indicative of wheel revolutions of said of primary driving wheels, respectively.

3. A system as claimed in claim 2, wherein said wheel revolution speed differential indicative signal generating means includes second wheel revolution sensors arranged to generate pulse trains indicative of wheel revolutions of said pair of secondary driving wheels, respectively.

4. A system as claimed in claim 3, wherein said wheel revolution speed differential indicative signal generating means includes a microcomputer responsive to said pulse trains generated by said wheel revolution sensors to perform arithmetic operations to determine a first wheel revolution speed differential between said pair of primary driving wheels, a second wheel revolution speed differential between said pair of secondary driving wheels, to determine whether or not at least one of said first and second wheel revolution speed differentials is substantially zero, and to compare the sign of said first wheel revolution speed differential with the sign of said second wheel revolution speed differential when it is determined that one of said first and second wheel revolution speed differentials are substantially zero.

5. A system as claimed in claim 4, wherein said differential limiting force control signal varying means causes said torque split and transfer means to vary said torque distribution ratio toward substantially 50:50 when the sign of said first wheel resolution speed is not equal to the sign of said second wheel revolution speed.

6. A method of controlling torque distribution to a pair of primary driving wheels and a pair of secondary driving wheels of a motor vehicle when said motor vehicle is making a turn, said vehicle having a torque split and transfer means for varying a torque distribution ratio which is the ratio of a portion of torque distributed to said pair of secondary driving wheels to the remaining portion of torque distributed to said pair of primary driving wheels in response to a torque distribution ratio indicative signal, and limited slip differential means disposed between said pair of primary driving wheels for varying differential limiting force between said pair of primary driving wheels in response to a differential limiting force indicative signal, said method comprising the steps of:

generating a wheel revolution speed differential indicative signal indicative of a wheel revolution speed of an outer one of said pair of primary driving wheels and an inner one of said pair of primary driving wheels;

varying said distribution ratio indicative signal in such a direction as to cause said torque split and transfer means to decrease said torque distribution ratio and varying said differential limiting force indicative signal in such a direction as to cause said limited slip differential means to decrease differential limiting force when said wheel revolution speed indicative signal indicates that said wheel revolution speed of said outer one of said pair of primary driving wheels is higher than said wheel revolution speed of said inner one of said pair of primary driving wheels; and varying said differential limiting force indicative signal in such a direction as to cause said limited slip differential means to increase said differential limiting force and varying said distribution ratio indicative signal in such a direction as to cause said torque split and transfer means to increase said torque distribution ratio when said wheel revolution speed differential indicative signal indicates that said wheel revolution speed of said inner one of said pair of primary driving wheels is higher than said wheel revolution speed of said outer one of said pair of primary driving wheels.

* * * * *